US011922911B1

(12) United States Patent
Hearn et al.

(10) Patent No.: US 11,922,911 B1
(45) Date of Patent: Mar. 5, 2024

(54) METHOD AND SYSTEM FOR PERFORMING MUSICAL SCORE

(71) Applicant: STAFFPAD LIMITED, London (GB)

(72) Inventors: David William Hearn, London (GB); Matthew Tesch, Pittsburgh, PA (US)

(73) Assignee: Staffpad Limited, London (GB)

( * ) Notice: Subject to any disclaimer, the term of this patent is extended or adjusted under 35 U.S.C. 154(b) by 0 days.

(21) Appl. No.: 18/061,028

(22) Filed: Dec. 2, 2022

(51) Int. Cl.
*G10H 1/00* (2006.01)
*G10G 1/00* (2006.01)

(52) U.S. Cl.
CPC ............. *G10H 1/0008* (2013.01); *G10G 1/00* (2013.01); *G10H 1/0066* (2013.01); *G10H 2210/051* (2013.01); *G10H 2210/076* (2013.01); *G10H 2210/095* (2013.01); *G10H 2210/105* (2013.01); *G10H 2220/121* (2013.01); *G10H 2240/056* (2013.01)

(58) Field of Classification Search
CPC ............... G10H 1/0025; G10H 1/0058; G10H 2210/066; G10H 1/361; G10H 2210/091; G10H 2210/076; G10H 2240/131; G10H 1/368; G10H 1/0033; G10H 7/00; G10H 2220/015; G10H 2210/031; G10H 1/383; G10H 2240/141
See application file for complete search history.

(56) References Cited

U.S. PATENT DOCUMENTS

| | | | | |
|---|---|---|---|---|
| 9,286,877 | B1 * | 3/2016 | Dabby | G10H 1/0025 |
| 2007/0289432 | A1 * | 12/2007 | Basu | G10H 7/008 84/609 |
| 2016/0098977 | A1 * | 4/2016 | Maezawa | G10G 1/00 84/602 |
| 2016/0189694 | A1 * | 6/2016 | Cowan | G10G 1/00 84/477 R |
| 2018/0182362 | A1 * | 6/2018 | Li | G10H 1/0025 |
| 2018/0350336 | A1 * | 12/2018 | Zhao | G10H 3/125 |
| 2019/0022351 | A1 * | 1/2019 | McCarthy | A61M 21/02 |

FOREIGN PATENT DOCUMENTS

| | | | | |
|---|---|---|---|---|
| DE | 202015006043 U1 * | 11/2015 | G01H 1/00 |
| KR | 102175257 B1 * | 11/2020 | |
| WO | WO-2007087080 A2 * | 8/2007 | G10H 1/0008 |
| WO | WO-2007131158 A2 * | 11/2007 | G10H 1/0008 |
| WO | WO-2020221745 A1 * | 11/2020 | G10G 1/00 |

* cited by examiner

*Primary Examiner* — Marlon T Fletcher
(74) *Attorney, Agent, or Firm* — Kevin J Fournier Intellectual Property Legal Services Ltd.; Kevin J Fournier

(57) ABSTRACT

Disclosed is a method for performing a musical score, the method comprising generating a plurality of score maps using at least one of an electronic representation of the musical score and event-based notations for at least one musical note in the musical score, wherein each score map corresponds to a single performance characteristic of the musical score and contains a plurality of events related to the single performance characteristic, and wherein each of the plurality of score maps is processed by a processing block to generate a plurality of playback characteristic maps.

21 Claims, 3 Drawing Sheets

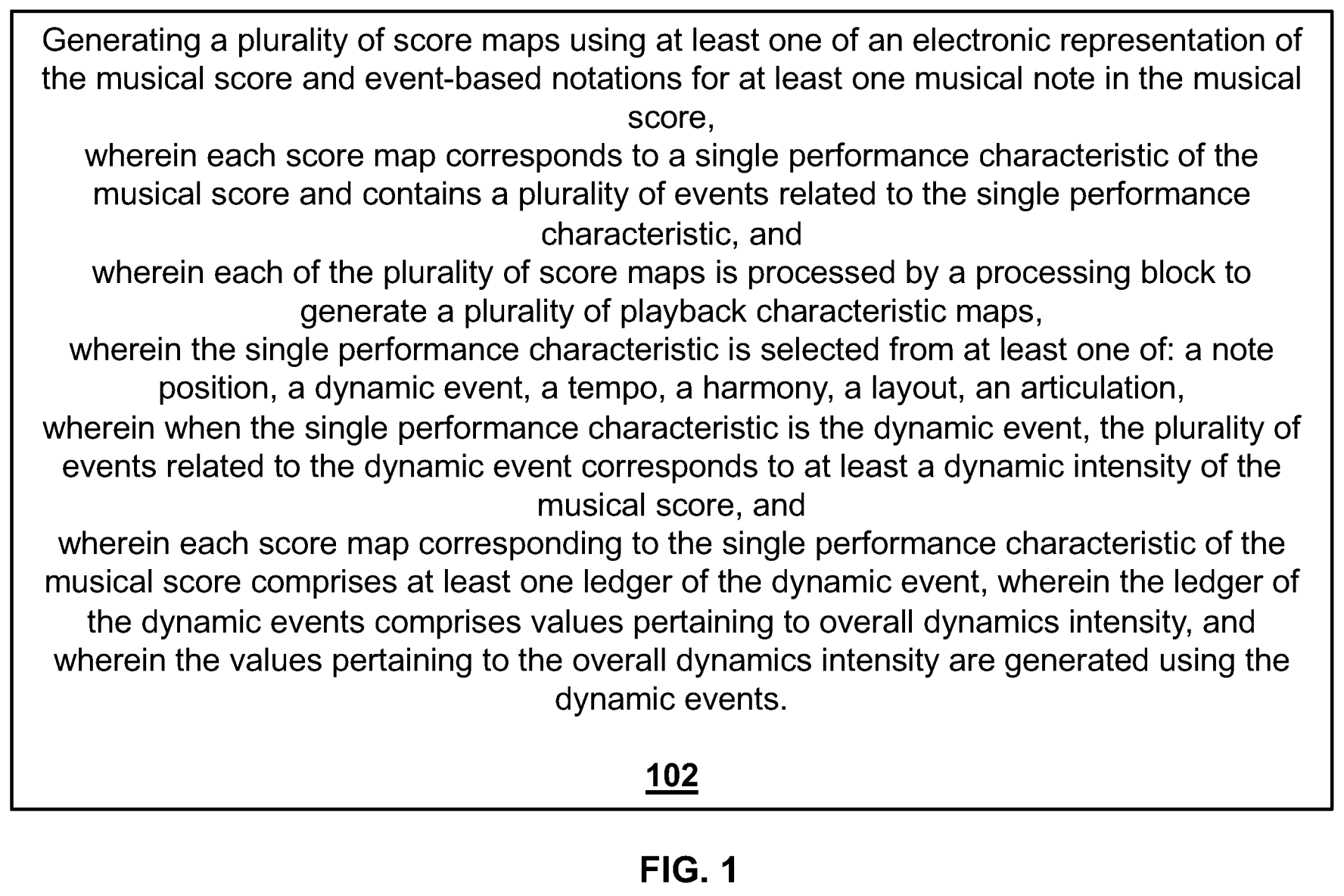

Generating a plurality of score maps using at least one of an electronic representation of the musical score and event-based notations for at least one musical note in the musical score,
wherein each score map corresponds to a single performance characteristic of the musical score and contains a plurality of events related to the single performance characteristic, and
wherein each of the plurality of score maps is processed by a processing block to generate a plurality of playback characteristic maps,
wherein the single performance characteristic is selected from at least one of: a note position, a dynamic event, a tempo, a harmony, a layout, an articulation,
wherein when the single performance characteristic is the dynamic event, the plurality of events related to the dynamic event corresponds to at least a dynamic intensity of the musical score, and
wherein each score map corresponding to the single performance characteristic of the musical score comprises at least one ledger of the dynamic event, wherein the ledger of the dynamic events comprises values pertaining to overall dynamics intensity, and
wherein the values pertaining to the overall dynamics intensity are generated using the dynamic events.

102

FIG. 1

METHOD AND SYSTEM FOR PERFORMING MUSICAL SCORE

TECHNICAL FIELD

This disclosure relates to performing musical scores. In particular, though not exclusively, this disclosure relates to a method for performing a musical score, a system for performing a musical score, and a computer program product for performing a musical score.

BACKGROUND

Musical scores have existed for hundreds of years as a way to visually describe compositional aspects of a piece of music into a written document which acts as a blueprint for interpreting the piece of music into a pleasing musical performance. Recently, score-writing software has emerged which enables users to create, edit and alter scores to visually high standards, and also playback the score via audio synthesis. Such audio synthesis works by triggering sound sources as defined by an event protocol. A common protocol for such synthesis is musical instrument digital interface (MIDI), which is a real-time protocol for co-ordinating messages amongst MIDI-specification enabled equipment, such as triggering MIDI sound modules from MIDI keyboards. Although playback can be created, it has been limited to conversion into MIDI messages.

However, such messaging protocols (such as MIDI) lack information required to reproduce a pleasing musical result via audio synthesis, and are computationally inefficient. This is partly because protocols such as MIDI protocol were not designed for the purpose of playing back a musical score file, and partly because the synthesis/sampling engines are not able to adequately prepare themselves for what's coming next, since as real-time engines they have no concept of 'a priori knowledge' or information about the score as a whole. Moreover, real-time audio generation is inherently computationally expensive and requires a large amount of storage, since all possible audio samples must be pre-loaded into fast access memory to facilitate the immediate availability of the samples to a synthesis engine. Furthermore, any digital signal processing must be performed after the synthesis engine has generated audio, which adds further computational complexity and time. Whilst such solutions are often described as "real-time", in reality there are often processing delays for generating audio output.

Therefore, in light of the foregoing discussion, there exists a need to overcome the aforementioned drawbacks associated with performing musical scores.

SUMMARY

A first aspect of the present disclosure provides a method for performing a musical score, the method comprising:

- generating a plurality of score maps using at least one of an electronic representation of the musical score and event-based notations for at least one musical note in the musical score,
- wherein each score map corresponds to a single performance characteristic of the musical score and contains a plurality of events related to the single performance characteristic, and
- wherein each of the plurality of score maps is processed by a processing block to generate a plurality of playback characteristic maps.

Optionally, the system further comprises a processing block which combines the plurality of score maps to form a master playback characteristic map containing the plurality of events related to the single performance characteristic from each of the plurality of score maps.

Optionally, the system further comprises a user interface that enables a user to enter the musical score into the system for creating and displaying an electronic representation of the musical score.

Optionally, the system further comprises an audio synthesis engine configured to process the master playback characteristic map for generating an acoustical playback of the musical score.

Optionally, the system further comprises at least one digital signal processing module. Optionally, the at least one digital signal processing module is configured to process the acoustical playback of the musical score.

Optionally, the system further comprises a sound generation device, wherein the sound generation device is configured to process and output the acoustical playback of the musical score.

Optionally, the system further comprises a performance generator configured to synchronise the output of the sound generation device and display the electronic representation of the musical score.

Optionally, a given score map is modifiable without altering other score maps amongst the plurality of score maps.

A third aspect of the present disclosure provides a computer program product for performing a musical score, the computer program product comprising a non-transitory machine-readable data storage medium having stored thereon program instructions that, when executed by a processing device, cause the processing device to:

- generate a plurality of score maps using at least one of an electronic representation of the musical score and event-based notations for at least one musical note in the musical score,
- wherein each score map corresponds to a single performance characteristic of the musical score and contains a plurality of events related to the single performance characteristic, and
- wherein each of the plurality of score maps is processed by a processing block to generate a plurality of playback characteristic maps.

BRIEF DESCRIPTION OF THE DRAWINGS

One or more embodiments of the present disclosure will now be described, by way of example only, with reference to the following diagrams wherein:

FIG. 1 illustrates a flowchart illustrating steps of a method for performing a musical score, in accordance with an embodiment of the present disclosure.

DETAILED DESCRIPTION OF PREFERRED EMBODIMENTS

Figure 2:
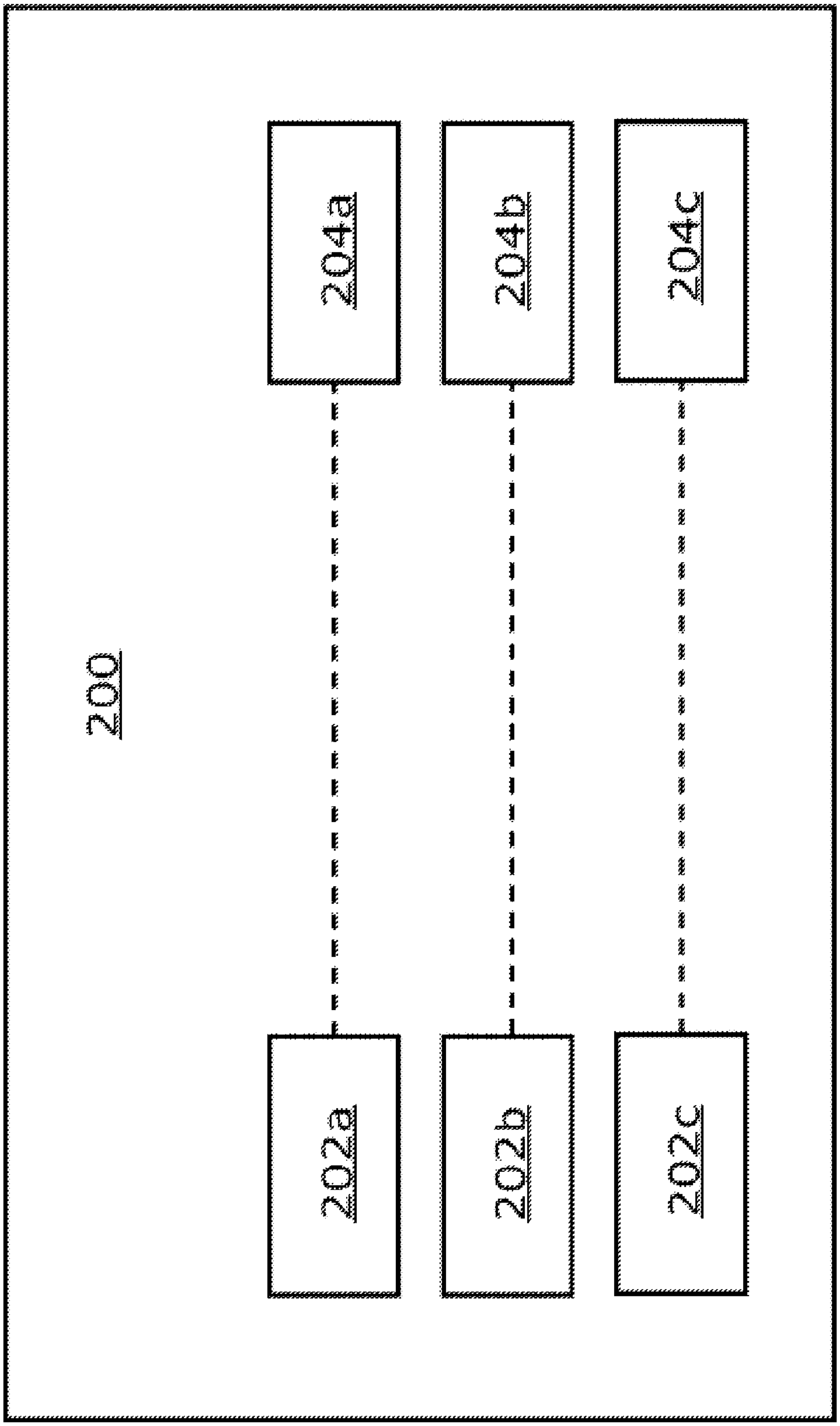
FIG. 2 illustrates a block diagram of a system for performing a musical score, in accordance with an embodiment of the present disclosure.

Throughout the present disclosure, the term "musical score" refers to a written form of a musical composition. Optionally, the musical score comprises a musical composition in printed or written form. Optionally, parts for different instruments appear on separate staves on large pages of the musical score. Optionally, the musical score is performed in at least one of: an audio manner, an audio-visual manner. Optionally, the musical score is created prior to performing. It will be appreciated that since the musical score contains information about an entirety of the musical composition, it does not have real-time requirements for playback. Thus, the electronic representation of the musical score can be utilised to generate the plurality of score maps that are tailored to and correspond to different aspects required for efficient, realistic score playback.

The term "score map" refers to a mapping of the musical score. Generally, a score map pertains to one aspect of the musical score. The electronic representation refers to discrete impulses or quantities arranged in coded patterns to represent the musical score in the form of electronic or digital characters. Optionally, the electronic representation is in a digitally written form of the musical score. Optionally, the plurality of score maps are generated also using user input corresponding to the musical score. It will be appreciated that the plurality of score maps are generated such that different aspects of the musical score get processed separately. Optionally, the plurality of score maps are maintained for performing the musical score. Beneficially, the plurality of score maps are generated and concurrently maintained to achieve a realistic playback from the musical score.

Optionally, the electronic representation of the musical score is created using at least an input from a user. Herein, the user may be a person skilled at least in the musical score. Optionally, the user is a person skilled in music. Since the user is skilled in music, they may be well-versed with musical notations utilised for creating the musical score. Moreover, the input may be either a correct notation or correction of a notation of the musical score. Optionally, the electronic representation of the musical score is created using a music notation software. Herein, the electronic representation of the musical score is checked, and, wherever applicable, corrected, using the input from the user. It will be appreciated that the electronic representation created using the input from the user will be accurate since the user is skilled in music.

Optionally, the event-based notations for the at least one musical note in the musical score are pre-generated. Alternatively, optionally, the event-based notations for the at least one musical note in the musical score are generated using a notation application. A musical note is a sound (i.e., musical data) in the musical score, wherein the musical note may be representative of musical parameters such as, but not limited to, pitch, duration, pitch class, and similar, required for musical playback of the musical note. The musical note may be a collection of one or more elements of the musical note, one or more chords, or one or more chord progressions. Typically, the musical note comprises a plurality of events and for each of the plurality of events, one or more parameters may be defined to provide a granular and precise definition of the entire musical note. For example, the event may be one of a note event (i.e., where an audible sound is present) or a rest event (i.e., no audible sound or a pause is present). A technical effect of utilizing event-based notations for generating the plurality of score maps is that such notations enable creation of accurate and detailed score maps, which subsequently facilitate accurate playback of the musical score. It will be appreciated event-based notations generated by any standard notational frameworks or custom notational frameworks are well within the scope of the present disclosure.

Optionally, the event-based notations are compatible with musical instrument digital interface (MIDI) protocol. MIDI allows for simultaneous provision of multiple notated instructions for numerous instruments. Optionally, the method further comprises generating MIDI-based notations using the one or more parameters related to the plurality of events of the at least one musical note. Optionally, in this regard, the one or more parameters comprise one or more of: a duration, a timestamp, a voice layer index, a pitch class, an octave, a pitch curve, an articulation map, a dynamic type, an expression curve, for the at least one musical note. A technical benefit of utilizing MIDI-based notations for generating the plurality of score maps is that MIDI-based notations (i.e., MIDI event-based notations) are accurate, realistically replicate musical notes, are versatile in nature (i.e., can be run on any platform or device), and provide a flexible playback protocol.

The single performance characteristic refers to a single aspect of the musical score which is characteristic of a performance of the musical score. For example, the single performance characteristic may be note position, which means that note positions in a musical score are an aspect which are characteristic of the performance of the musical score. The plurality of events refer to variables corresponding to the single performance characteristic. Examples of the plurality of events include, but are not limited to, a duration, a timing, a position, an event, a speed, a repetition. It will be appreciated that changes in the plurality of events of the single performance characteristic or an order thereof results in changes in the musical score. The plurality of events are related to the single performance characteristic since the variables are defining characteristics of the single performance characteristic.

Optionally, the single performance characteristic is selected from at least one of: a note position, a dynamic event, a tempo, a harmony, a layout, an articulation. Herein, the note position refers to a position of a note on the musical score. Optionally, when the single performance characteristic is the note position, the plurality of events related to the note position correspond to at least one of: a time-stamped position of a given note within the musical score, a duration of the given note within the musical score, a pitch of the given note within the musical score. The time-stamped position of the given note may provide insight pertaining to the exact occurrence of the given note within the musical score. The duration of the given note may provide insight pertaining to how short or long the given note may be within the musical score. The pitch may provide insight pertaining to a degree of highness or lowness of the given note within the musical score. Herein, the score map corresponding to the single performance characteristic may contain a ledger of every note event's precisely time-stamped position, the note's corresponding duration, and the note event's pitch. Moreover, knowledge of the plurality of events (i.e., note position, or length) when the single performance characteristic is the note position enables the audio synthesis engine to utilise appropriate samples from a data set of musical samples. For example, the audio synthesis engine may be able to accurately identify that a sustained note may sound more realistic than looping a short note, and choose the former.

Moreover, the dynamic event refers to a symbolic event in the musical score. Optionally, when the single performance characteristic is the dynamic event, the plurality of events related to the dynamic event corresponds to at least a dynamic intensity of the musical score. As stated above, dynamic events pertain to symbolic events, for example, 'mp', 'ff' or 'pp' sounds, hairpins or text-based indications of a crescendo or decrescendo, or a collection of user-defined point inputs on a X/Y graph-like system corresponding to an intensity. Herein, the score map corresponding to the single performance characteristic may contain a ledger of dynamic events. The ledger of dynamic events may contain values pertaining to overall dynamics intensity, wherein the values may be generated using the dynamic events. It will be appreciated that knowledge of a crescendo, diminuendo, or other such dynamic events, allows selection of appropriate samples for generating realistic playback. For example, a loud note at the end of a crescendo may suit better with a loud sample (since other characteristics of the sound, for example, the timbre may be affected by a force with which the note is played), rather than using a generic sample which is simply played back at higher volume.

The tempo refers to a playback speed of the musical score. Optionally, when the single performance characteristic is the tempo, the plurality of events related to the tempo correspond to at least one of: a playback speed, an event that affects the playback speed, a modifier of playback speed, within the musical score. Herein, the playback speed is the pace at which a given note of the musical score is played. It will be appreciated that some notes are played quickly while others are slow. Moreover, different music types generally have different tempos. Herein, the score map corresponding to the single performance characteristic may contain information about the playback speed and events having an effect on playback speed (such as, for example, written or numerical tempo information expressed in bpm, or modifiers such as a fermata symbol). It will be appreciated that taking generic samples and speeding them up sounds artificial (for example, clipping of note endings). Therefore, knowledge of tempo change (for example, fast sections in the musical score) permits selection of appropriately realistic audio samples for the playback.

The harmony refers to simultaneously occurring frequencies, pitches, or chords in the musical score. Optionally, when the single performance characteristic is the harmony, the plurality of events related to simultaneously occurring frequencies, pitches or chords are utilised to map musical phrases within the musical score. The layout refers to a pause in the musical score. Optionally, when the single performance characteristic is the layout, the plurality of events related to pauses in the musical score are utilised to map musical phrases within the musical score.

The articulation refers to a sound of a given note in the musical score. Optionally, when the single performance characteristic is the articulation, the plurality of events related to articulation are utilised to map musical phrases within the musical score. Herein, the score map corresponding to the single performance characteristic may contain information about how an event's corresponding musical symbol or articulation event should be handled. Moreover, the score map may be responsible for tracking notes which are part of a longer phrase. Herein, a phrase refers to a sequence of note events between two rest events, with special cases for the start, end, and repeat portions of the musical score. It will be appreciated that knowledge of the plurality of events when the single performance characteristic is the articulation is beneficial since it assists in selection of appropriately realistic samples. For example, if a note has emphasis placed at a beginning of the note, an appropriately realistic audio sample may be selected rather than a static sample with an increased volume at the beginning of the note. Alternatively, an attack, decay, sustain, and release (ADSR) envelope may be utilised to imitate actual articulation.

It will be appreciated that each of the single performance characteristics are processed individually to save computing time and effort. It will also be appreciated that the single performance characteristic assists in achieving a realistic playback output. Beneficially, the plurality of score maps may be accessed independently and concurrently; as well as traversed or traced to provide information for any time position or point in the musical score. This information may then be utilised to generate a realistic audio output rendering.

The term "processing block" refers to a hardware, software, firmware, or a combination of these configured to control operation of the system. In this regard, the processing block performs several complex processing tasks. The at least one processor is communicably coupled to other components wirelessly and/or in a wired manner. In an example, the processing block may be implemented as a programmable digital signal processor (DSP). In another example, the processing block may be implemented via a cloud server that provides a cloud computing service. It will be appreciated that the plurality of processing blocks compute a processing unit. Herein, each of the processing blocks amongst the plurality of processing blocks are dedicated to process each score map amongst the plurality of score maps. Optionally, the processing block is coupled to a data repository, wherein the data repository is configured to store data pertaining to the musical score. Optionally, the processing block is communicably coupled to the data repository using a communication network. The communication network may be a wired network, a wireless network, or any combination thereof. Examples of the communication network include, but are not limited to, Local Area Networks (LANs), Wide Area Networks (WANs), Internet, radio networks and telecommunication networks.

The term "playback characteristic map" refers to a mapping of playback characteristics pertaining to the single performance characteristic. In other words, the playback characteristic map is a mapping of playback characteristics of the single performance characteristic associated with the score map processed to generate the playback characteristic map. For example, if the single performance characteristic is the tempo, then the playback characteristic map would be a mapping of the tempo throughout the musical score. Individual processing of the plurality of score maps generates playback characteristic maps amongst the plurality of playback characteristic maps. This means that a given processing block processes only a given score map to generate a given playback characteristic map, and another given processing block processes another given score map to generate another given playback characteristic map. Notably, the playback characteristic maps received post-processing from the plurality of processing blocks, altogether are denoted as the plurality of playback characteristic maps. The plurality of playback characteristic maps correspond to various characteristics defined within the musical score. It will be appreciated that such individual processing beneficially provides an appealing and realistic sound.

Optionally, the method further comprises combining the plurality of playback characteristic maps to form a master playback characteristic map containing the plurality of events related to the single performance characteristic from each of the plurality of score maps. The master playback characteristic map refers to a compilation of the plurality of playback characteristic maps. Notably, the master playback characteristic map pertains to all of the single performance characteristics. It will be appreciated that implementing such maps comprises an ability to update maps independently and concurrently. Optionally, at least one map is updated using a differential update engine. The differential update engine is a processing engine that partially updates the at least one map. Moreover, the differential update engine updates only differences between a previous version and a new version of the at least one map. This is beneficial since it does not waste computational energy on updating an entirety of the at least one map. Notably, the at least one map may be implemented as at least one of: a score map, a playback characteristic map. Beneficially, the at least one map is not required to be recomputed entirely for each note change, saving time and costs.

Optionally, the method further comprises processing the master playback characteristic map using an audio synthesis engine for generating an acoustical playback of the musical score. The audio synthesis engine refers to an electronic musical instrument that generates audio signals. Generally, the audio synthesis engine creates sounds (i.e., the acoustical playback) by generating waveforms using subtractive synthesis, additive synthesis and/or frequency modulation synthesis. These sounds may be altered by components such as filters, which cut or boost frequencies; envelopes, which control articulation, or how notes begin and end; and low-frequency oscillators, which modulate parameters such as pitch, volume, or filter characteristics affecting timbre. The acoustical playback is the actual sound which is heard by the user. It will be appreciated that since the user is skilled in music, they may be able to identify if an accurate and/or aesthetic sound is created in the acoustical playback.

Optionally, the master playback characteristic map is generated prior to the processing of the master playback characteristic map by the audio synthesis engine. Moreover, since the master playback characteristic map is deterministic, the acoustic playback may be pre-rendered, and changes therein may be updated. It will be appreciated that having future knowledge of the musical score makes the acoustical playback efficient and musically context-aware, and thus is able to achieve a musically more pleasing result. Additionally, since the audio synthesis engine has more information about the musical score, it may be utilised for generating pleasing musical performance characteristics within the acoustical playback. Beneficially, the generation of the master playback characteristic map prior to the processing of the master playback characteristic map distinguishes the method from real-time implementations. It will be appreciated that the audio synthesis engine comprises information pertaining to the musical score in advance. Due to this, the audio synthesis engine can load the master playback characteristic map onto a data structure (for example, such as cache files stored on a cache memory) instead of uploading vast amounts of musical sample data and selecting required samples during playback. This is beneficially computationally efficient since it requires low memory usage and also produces a realistic playback.

Optionally, the processing of the master playback characteristic map by the audio synthesis engine comprises identifying a subset of musical sample data from a master set of musical sample data, based at least on the master playback characteristic map, wherein the subset of musical sample data includes musical sample data required to create the data for acoustical playback of the musical score. The term "musical sample data" refers to acoustical data which represents sounds created by different notes of the musical score. Notes are musical sounds which represent the pitch, the duration of a sound and/or a pitch class in the musical score. The master set of musical sample data may contain all possible sounds, and the subset of musical sample data may contain sounds pertaining to the musical score. Optionally, the subset of musical sample data excludes sample data that is not required to create the data for acoustical playback of the musical score. In other words, sounds that are not required or denoted in the musical score are omitted from the subset of musical sample data. It will be appreciated that since the master playback characteristic map is an appropriate representation of sounds of the musical score, the master playback characteristic map is utilised to identify the subset of musical sample data. Moreover, since the acoustical playback is pre-rendered, there is no real-time requirement of loading the acoustical playback, enabling the audio synthesis engine to appropriately utilise the subset of musical sample data.

Optionally, the method further comprises processing the acoustical playback of the musical score using at least one digital signal processing module. The at least one digital signal processing module mathematically manipulates digitized versions of real-world signals like voice, audio, video, temperature, pressure, and/or position. Typically, at least one digital signal processing module is designed for performing mathematical functions like 'add', 'subtract', 'multiply' and 'divide' very quickly. In this regard, individual sounds from the subset of musical sample data may be stitched together to form the acoustical playback. Herein, such individual sounds from the subset of musical sample data may be pre-stitched together without having to preload them wholly or partially into the data repository. This beneficially reduces an overall memory footprint and the computational costs by not having to process and stream files from disk quickly.

Optionally, the at least one digital signal processing module is configured to smooth a transition between two notes from the subset of musical sample data while generating the acoustical playback. It will be appreciated that a note may be split into two phases; a note-on, and a note-off. The note-on portion of the note may sustain for as long as the note-on is being received, such that when a note-off message is received, a corresponding 'release' sample data may be triggered. This release sample data contains an end portion of a note (i.e., the note-off), as well as any additional audio information, such as a reverb tail of the note ringing out in a hall, or a final hit of a timpani or cymbal roll. Herein, an end of a note is anticipated, and the two notes are crossfaded in such a manner that the transition sounds realistic. Such sample data capture a sound of note change (i.e., a sound between the notes). Moreover, a next note must be anticipated to trigger appropriate transition sample data from the subset of musical sample data.

It will be appreciated that a two note melodic sequence comprises four individual phases, namely, an attack phase, a sustain phase, an interval phase and a release phase. The attack phase captures an onset of a first note, the sustain phase sustains an onset of the first note, the interval phase captures an interval between the two notes and the release phase finishes or ends the two note melodic sequence. Since these individual phases trigger different audio samples, they are stitched together as smoothly as possible to avoid the user from detecting individual audio samples. It is beneficial to optimise lengths of the individual phases to maximise and ensure a smooth crossfade transition. The master playback characteristic map allows the at least one digital signal processing module to know precisely when the interval should occur, and thus it can ensure the maximal use of interval samples itself, and additionally compute optimal crossfade lengths, starts and shapes to ensure the smoothest transition between all the phases. All these transition effects, whilst subtle, combine and contribute to a pleasing and realistic musical performance.

Optionally, the method further comprises sending the acoustical playback to a sound generation device. The sound generation device is a device which creates audio signals built from one or more basic waveforms, to generate sound in a real-world environment. Optionally, the acoustical playback is sent to the sound generation device for playback. In other words, the sound generation device plays the acoustical playback in the real-world environment. It will be appreciated that the acoustical playback can be heard by the user only when it is generated by the sound generation device. Optionally, the sound generation device is implemented as a speaker. Examples of the speaker include, but are not limited to, a pair of earphones, headphones, a loudspeaker, a hand-held speaker, an electrostatic speaker.

Optionally, the method further comprises rendering a playback result, using the acoustical playback, to a data structure maintained at a data repository, as a background process, wherein the background process comprises an entirety of the musical score. The data structure may, for example, be a series of files, or similar. For example, the data structure may be a series of cache files maintained at a cache memory. The cache files are temporary files which store small amounts of data for display, editing or processing. For example, while watching a video on YouTube, portions of the video are stored in a user device as cache files on a cache memory which enables the ease of loading the video. It will be appreciated that the data repository is not limited to only the cache memory, and encompasses various types of data storage such as, but not limited to, a memory of a device, a cloud-based memory, and a removable memory. The background process refers to computational processes in a system which are simultaneously carried in a background while other operations are also executed on the system. Upon completion of the background process, the entirety of the musical score is rendered. Optionally, the playback result is rendered prior to sending the acoustical playback to the sound generation device. Herein, the playback result may be updated only when a change would invalidate a portion of the data structure (for example, a portion of a cache file). A technical advantage of this is that it saves time and computational resources since the playback parameters are not computed for each note in the musical score in real time.

It will be appreciated that chunks of the playback result may be rendered based on information on the map even when the host application is not in a playback state. As mentioned above, such rendering may be done as the background process and called when the host application enters a playback state, resulting in immediate playback from a chunk of pre-rendered data structure (for example, from a chunk of pre-rendered cache). Optionally, the pre-rendered data structure may be implemented as one of: a time-based pre-render, a complete pre-render. The time-based pre-render may pertain to rendering the playback result for a significant chunk of time. For example, 2 seconds of sound may be pre-rendered and held in the data repository to act as a ring-buffer while playing the playback result. The complete pre-render may pertain to rendering an entirety of the playback result. Herein, portions of the musical score may be rendered to audio chunks while a user interface is in a dormant state, reducing computational tasks from trying to reconstruct the musical score from the master set of musical sample data to the playback result. Moreover, once a given master playback characteristic map has been notified with an update, a corresponding time window from where the change occurs may be re-rendered.

A second aspect of the present disclosure provides a system for performing a musical score, the system comprising:

a plurality of score maps generated using at least one of an electronic representation of the musical score and event-based notations for at least one musical note in the musical score, wherein each score map corresponds to a single performance characteristic of the musical score and contains a plurality of events related to the single performance characteristic; and a plurality of processing blocks for processing the plurality of score maps to generate a plurality of playback characteristic maps.

A third aspect of the present disclosure provides a computer program product for performing a musical score, the computer program product comprising a non-transitory machine-readable data storage medium having stored thereon program instructions that, when executed by a processing device, cause the processing device to:

generate a plurality of score maps using at least one of an electronic representation of the musical score and event-based notations for at least one musical note in the musical score, wherein each score map corresponds to a single performance characteristic of the musical score and contains a plurality of events related to the single performance characteristic, and wherein each of the plurality of score maps is processed by a processing block to generate a plurality of playback characteristic maps.

In an embodiment, the non-transitory machine-readable data storage medium can direct a machine (such as computer, other programmable data processing apparatus, or other devices) to function in a particular manner, such that the program instructions stored in the non-transitory machine-readable data storage medium cause a series of steps to implement the function specified in a flowchart corresponding to the instructions. Examples of the non-transitory machine-readable data storage medium includes, but is not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof.

Optionally, the processing device is further caused to combine the plurality of playback characteristic maps to form a master playback characteristic map containing the plurality of events related to the single performance characteristic from each of the plurality of score maps.

Optionally, the processing device is further caused to process the master playback characteristic map using an audio synthesis engine for generating an acoustical playback of the musical score.

Optionally, the processing device is further caused to process the acoustical playback of the musical score using at least one digital signal processing module.

Optionally, the processing device is further caused to send the acoustical playback to a sound generation device.

Optionally, the electronic representation of the musical score is created using at least an input from a user.

Optionally, the single performance characteristic is selected from at least one of: a note position, a dynamic event, a tempo, a harmony, a layout, an articulation.

Optionally, when the single performance characteristic is the note position, the plurality of events related to the note position correspond to at least one of: a time-stamped position of a given note within the musical score, a duration of the given note within the musical score, a pitch of the given note within the musical score.

Optionally, when the single performance characteristic is the dynamic event, the plurality of events related to the dynamic event corresponds to at least a dynamic intensity of the musical score.

Optionally, when the single performance characteristic is the tempo, the plurality of events related to the tempo correspond to at least one of: a playback speed, an event that affects the playback speed, a modifier of playback speed, within the musical score.

Optionally, when the single performance characteristic is the articulation, the plurality of events related to articulation are utilised to map musical phrases within the musical score.

Optionally, the master playback characteristic map is generated prior to the processing of the master playback characteristic map by the audio synthesis engine.

Optionally, the processing of the master playback characteristic map by the audio synthesis engine comprises identifying a subset of musical sample data from a master set of musical sample data, based at least on the master playback characteristic map, wherein the subset of musical sample data includes musical sample data required to create the data for acoustical playback of the musical score.

Optionally, the processing device is further caused to render a playback result, using the acoustical playback, to a data structure as a background process, wherein the background process comprises an entirety of the musical score.

Throughout the description and claims of this specification, the words "comprise" and "contain" and variations of the words, for example "comprising" and "comprises", mean "including but not limited to", and do not exclude other components, integers or steps. Moreover, the singular encompasses the plural unless the context otherwise requires: in particular, where the indefinite article is used, the specification is to be understood as contemplating plurality as well as singularity, unless the context requires otherwise.

Preferred features of each aspect of the present disclosure may be as described in connection with any of the other aspects. Within the scope of this application, it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible.

Referring to FIG. 1, illustrated is a flowchart illustrating steps of a method for performing a musical score, in accordance with an embodiment of the present disclosure. At step 102, a plurality of score maps are generated using at least one of an electronic representation of the musical score and event-based notations for at least one musical note in the musical score, wherein each score map corresponds to a single performance characteristic of the musical score and contains a plurality of events related to the single performance characteristic, and wherein each of the plurality of score maps is processed by a processing block to generate a plurality of playback characteristic maps, wherein each score map corresponding to the single performance characteristic of the musical score comprises at least one ledger of the dynamic event, wherein the ledger of the dynamic events comprises values pertaining to overall dynamics intensity, and wherein the values pertaining to the overall dynamics intensity are generated using the dynamic events.

Referring to FIG. 2, illustrated is a block diagram of a system 200 for performing a musical score, in accordance with an embodiment of the present disclosure. As shown, the system 200 comprises a plurality of score maps 202*a*, 202*b*, and 202*c* (hereinafter collectively referred to as 202), and a plurality of processing blocks 204*a*, 204*b*, and 204*c* (hereinafter collectively referred to as 204). The plurality of score maps 202 are generated using at least one of an electronic representation of the musical score and event-based notations for at least one musical note in the musical score, wherein each score map corresponds to a single performance characteristic of the musical score and contains a plurality of events related to the single performance characteristic. The plurality of processing blocks 204 are used for processing the plurality of score maps 202 to generate a plurality of playback characteristic maps. In such, processing block 204*a* may be utilised to process score map 202*a*, processing block 204*b* may be utilised to process score map 202*b*, and processing block 204*c* may be utilised to process score map 202*c*.

Figure 3:
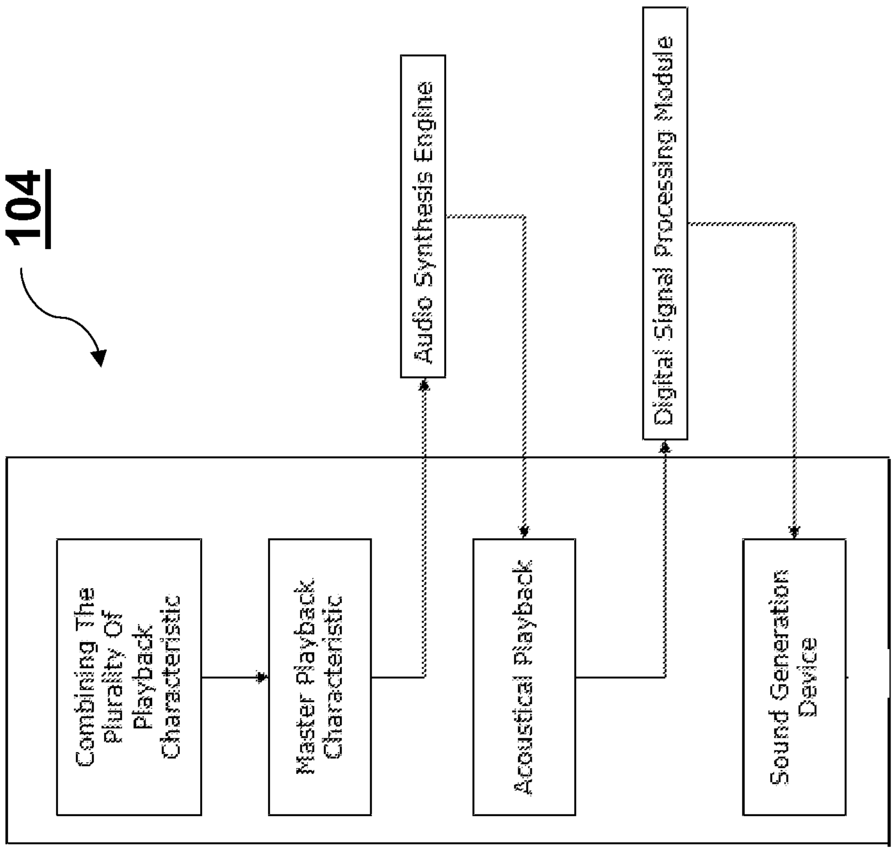
FIG. 3 illustrates a block diagram of a system for performing a musical score, in accordance with an embodiment of the present disclosure.

Referring to FIG. 3, illustrated is a block diagram of the method for performing a musical score, in accordance with an embodiment of the present disclosure. At step 104, the combining of the plurality of playback characteristic maps is done, to form a master playback characteristic map containing the plurality of events related to the single performance characteristic from each of the plurality of score maps, and the processing of the master playback characteristic map is done using an audio synthesis engine for generating an acoustical playback of the musical score. The method further comprises processing the acoustical playback of the musical score using at least one digital signal processing module, and sending the acoustical playback to a sound generation device.

The above-mentioned steps are only illustrative and other alternatives can also be provided where one or more steps are added, one or more steps are removed, or one or more steps are provided in a different sequence without departing from the scope of the claims herein.

What is claimed is:

1. A method for performing a musical score, the method comprising:

generating a plurality of score maps using at least one of an electronic representation of the musical score and event-based notations for at least one musical note in the musical score, wherein each score map corresponds to a single performance characteristic of the musical score and contains a plurality of events related to the single performance characteristic, and wherein each of the plurality of score maps is processed by a processing block to generate a plurality of playback characteristic maps, wherein the single performance characteristic is selected from at least one of: a note position, a dynamic event, a tempo, a harmony, a layout, an articulation, wherein when the single performance characteristic is the dynamic event, the plurality of events related to the dynamic event corresponds to at least a dynamic intensity of the musical score, and wherein each score map corresponding to the single performance characteristic of the musical score comprises at least one ledger of the dynamic event, wherein the ledger of the dynamic events comprises values pertaining to overall dynamics intensity, and wherein the values pertaining to the overall dynamics intensity are generated using the dynamic events.

2. The method of claim 1, wherein the method further comprises combining the plurality of playback characteristic maps to form a master playback characteristic map containing the plurality of events related to the single performance characteristic from each of the plurality of score maps.

3. The method of claim 2, wherein the method further comprises processing the master playback characteristic map using an audio synthesis engine for generating an acoustical playback of the musical score.

4. The method of claim 3, wherein the method further comprises processing the acoustical playback of the musical score using at least one digital signal processing module.

5. The method of claim 3, wherein the method further comprises sending the acoustical playback to a sound generation device.

6. The method of claim 1, wherein the electronic representation of the musical score is created using at least an input from a user.

7. The method of claim 1, wherein when the single performance characteristic is the note position, the plurality of events related to the note position correspond to at least one of: a time-stamped position of a given note within the musical score, a duration of the given note within the musical score, a pitch of the given note within the musical score.

8. The method of claim 1, wherein when the single performance characteristic is the tempo, the plurality of events related to the tempo correspond to at least one of: a playback speed, an event that affects the playback speed, a modifier of playback speed, within the musical score.

9. The method of claim 1, wherein when the single performance characteristic is the articulation, the plurality of events related to articulation are utilised to map musical phrases within the musical score.

10. The method of claim 3, wherein the master playback characteristic map is generated prior to the processing of the master playback characteristic map by the audio synthesis engine.

11. The method of claim 3, wherein the processing of the master playback characteristic map by the audio synthesis engine comprises identifying a subset of musical sample data from a master set of musical sample data, based at least on the master playback characteristic map, wherein the subset of musical sample data includes musical sample data required to create the data for acoustical playback of the musical score.

12. The method of claim 3, wherein the method further comprises rendering a playback result, using the acoustical playback, to a data structure maintained at a data repository, as a background process, wherein the background process comprises an entirety of the musical score.

13. A computer program product for performing a musical score, the computer program product comprising a non-transitory machine-readable data storage medium having stored thereon program instructions that, when executed by a processing device, cause the processing device to perform the method of claim 1.

14. A system for performing a musical score, the system comprising:

a plurality of score maps generated using at least one of an electronic representation of the musical score and event-based notations for at least one musical note in the musical score, wherein each score map corresponds to a single performance characteristic of the musical score and contains a plurality of events related to the single performance characteristic; and a plurality of processing blocks for processing the plurality of score maps to generate a plurality of play back characteristic maps, wherein the single performance characteristic is selected from at least one of: a note position, a dynamic event, a tempo, a harmony, a layout, an articulation, wherein when the single performance characteristic is the dynamic event, the plurality of events related to the dynamic event corresponds to at least a dynamic intensity of the musical score, and wherein each score map corresponding to the single performance characteristic of the musical score comprises at least one ledger of the dynamic event, wherein the ledger of the dynamic events comprises values pertaining to overall dynamics intensity, and wherein the values pertaining to the overall dynamics intensity are generated using the dynamic events.

15. The system of claim 14, further comprising a processing block which combines the plurality of score maps to form a master playback characteristic map containing the plurality of events related to the single performance characteristic from each of the plurality of score maps.

16. The system of claim 14, further comprising a user interface that enables a user to enter the musical score into the system for creating and displaying an electronic representation of the musical score.

17. The system of claim 14, further comprising an audio synthesis engine configured to process the master playback characteristic map for generating an acoustical playback of the musical score.

18. The system of claim 14, further comprising at least one digital signal processing module.

19. The system of claim 18, further comprising a sound generation device, wherein the sound generation device is configured to process and output the acoustical playback of the musical score.

20. The system of claim 19, further comprising a performance generator configured to synchronise the output of the sound generation device and display the electronic representation of the musical score.

21. The system of claim 14, wherein a given score map is modifiable without altering other score maps amongst the plurality of score maps.

* * * * *